Oct. 19, 1943.  E. A. RICHARDSON  2,332,400
WEEDLESS FISH LURE
Filed Aug. 28, 1941
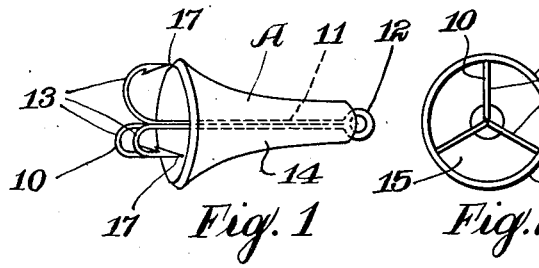
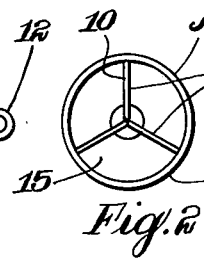
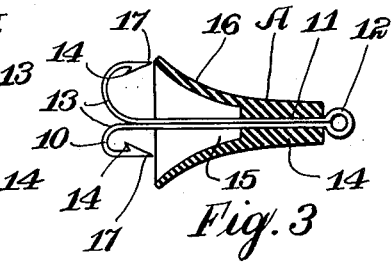
Fig. 1  Fig. 2  Fig. 3
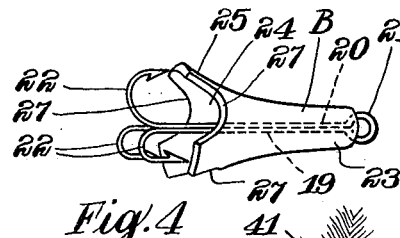
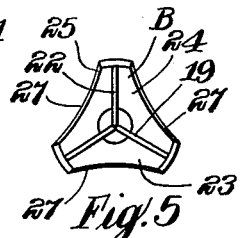
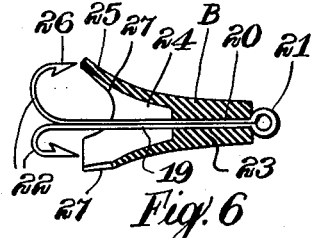
Fig. 4  Fig. 5  Fig. 6
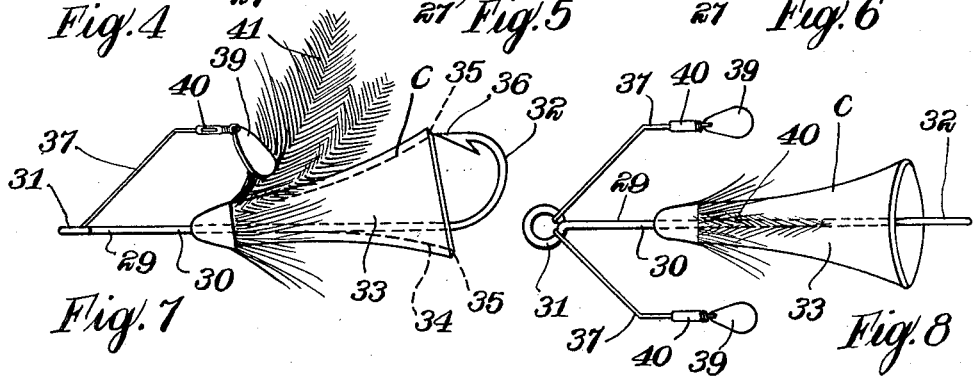
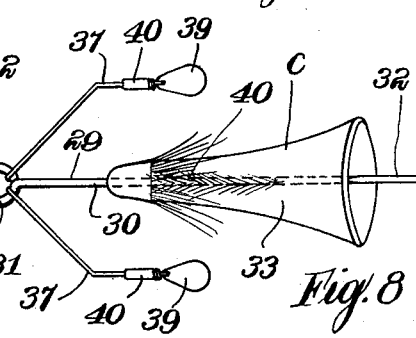
Fig. 7  Fig. 8
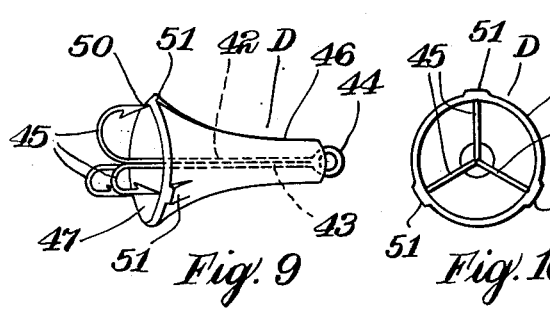
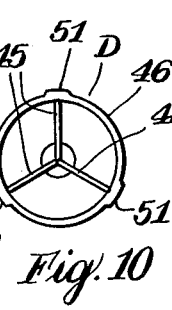
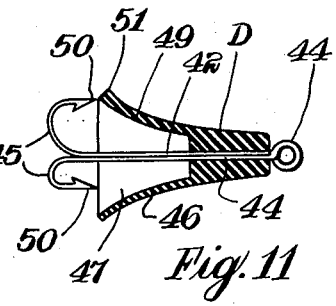
Fig. 9  Fig. 10  Fig. 11
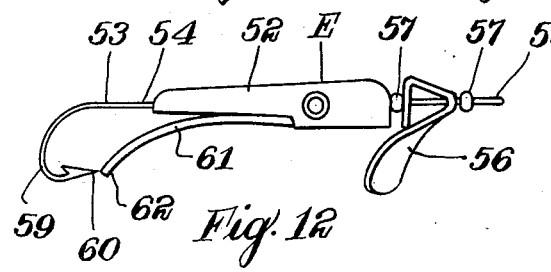
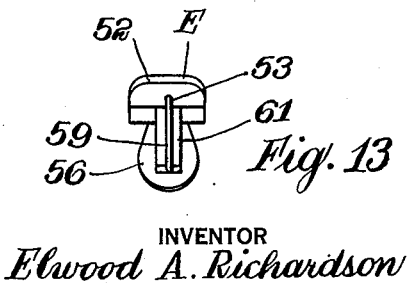
Fig. 12  Fig. 13
INVENTOR
Elwood A. Richardson
BY Robert M. Dunning
ATTORNEY Patented Oct. 19, 1943

2,332,400

UNITED STATES PATENT OFFICE 2,332,400

WEEDLESS FISH LURE

Elwood A. Richardson, Turtle Lake, Wis.

Application August 28, 1941, Serial No. 408,560

8 Claims. (Cl. 43—39)

My invention relates to an improvement in weedless fishing hooks, wherein it is desired to provide a hook which may be used among weeds with little danger of the hook becoming fouled in the weeds.

In constructing a weedless fishing hook several factors must be considered. Primarily the hook must be weedless. In other words, the point or barb of the hook must be protected by some means so that the hook in trawling or casting or when in motion through the water will not become entangled in weeds, brush, stones, or other obstructions.

In the second place, the hook must have the proper degree of sensitivity. In order to be an effective bait the protection for the point of the hook must be sensitive to the closing or pressure of the mouth of the fish. The more sensitive the action of the protective device, the more effective the bait or hook in catching fish.

Other factors which should be considered in the design of a weedless hook is that the device should be readily adaptable to be used on a multiple hook, such as a twin or treble hook. A fourth factor of importance is that the protective device should be such that it may be used as a lure as well as a protection for the hook. These last two factors are advantageous, but not essential. The last factor of importance is that the device should be simple in construction, easy to assemble, and economical in cost.

In order that the hook be weedless, it is necessary that the protective device shall give positive protection to the point or barb of the hook. In addition, it is necessary that the protective device in itself must be as free as possible of anything that will tangle in weeds or bush. It should preferably be streamlined so that it will readily pass by such obstructions as logs or stones with which it may come in contact. In addition the streamlined protective device will also lessen the resistance of the water to the passage of the bait through the water, and thereby lessen the drag on the line.

The sensitivity of the bait is of extreme importance and must be compromised with the factor of weedlessness, as the two are opposed to each other. In general, the more sensitive the protective device is to the pressure of the fish's mouth, the more readily the protective device will be removed from the point of the hook and cease to protect. Contrarily, the less sensitive the protective device, the better will be its factor of weedlessness. Another factor entering into the sensitivity of the device is that the protective device should be as close to the hook point as it is possible to place it. When fish bite on an artificial lure or anything not a natural food, such as a hook or protective device for the hook, the natural instinct of most fish is to spit out or attempt to spit out the hook as soon as they realize their mistake.

Obviously, with any protective device, there will be a certain interval of time between the time that the fish's mouth makes contact with the protective device and the time of contact with the hook. It is during this time interval that the fish may and could spit out the hook. The shorter this interval of time, the more sensitive will be the weedless hook and the more effective. This time interval will be shorter, the closer the protective device is to the points of the hook, hence it is essential for maximum efficiency that the protective device be immediately adjacent or substantially in contact with the hook point.

In addition to this the more closely the material used in the protective device is to the natural food of fish, the less likely the fish will realize that the substance is artificial and the less likely that the fish will spit out the hook. In other words, the slower the fish is to realize his mistake, the shorter the time interval during which the fish could get rid of the hook. Obviously some flexible material, such as rubber should be used for the protective device from the standpoint of similarity to natural food. This use of flexible material, such as rubber, also makes it possible to incorporate the protective device into a lure or artificial bait.

It is an object of my invention to fulfill the foregoing requirements by providing a lure which is preferably formed of some material such as rubber and which extends into close proximity with the hook without actually engaging the same. As a result the lure body protecting the hook has the proper degree of sensitivity to keep the hook from fouling in the weeds, and at the same time does not provide an interval of any considerable amount during which the fish can eject the bait. Because of the nearness of the protective device to the hook, and because of the fact that the lure is formed of soft resilient material there is an extremely short interval between the time a fish recognizes that he is making a mistake and the time when he is actually caught by the hook.

A feature of my invention resides in the provision of a lure which is of small size or diameter at the forward end, and which gradually increases in diameter or width as it approaches the hook. Thus the hook is streamlined and will readily pass through obstructions.

These and other objects and novel features of my invention will be more clearly and fully set forth in the following specification and claims.

In the drawing forming a part of my specification:

Figure 1 is a perspective view of one form of weedless hook which embodies the principles of my invention.

Figure 2 is an end view of the hook illustrated in Figure 1.

Figure 3 is a longitudinal section through the weedless hook or lure illustrated in Figures 1 and 2.

Figure 4 is a perspective view of a slightly different form of lure construction.

Figure 5 is an end view of the lure illustrated in Figure 4.

Figure 6 is a longitudinal section through the weedless lure illustrated in Figures 4 and 5.

Figure 7 is a side elevation view of a modified form of lure construction.

Figure 8 is a top plan view of the lure illustrated in Figure 7.

Figure 9 is a perspective view of a slightly different form of lure construction.

Figure 10 is an end view of the lure illustrated in Figure 9.

Figure 11 is a sectional view through the lure illustrated in Figures 9 and 10.

Figure 12 is a side elevation view of another modified form of lure construction.

Figure 13 is an end view of the lure illustrated in Figure 12.

The lure A illustrated in Figures 1, 2, and 3 of the drawing embodies a treble hook 10 which includes a shank 11 having a hook eye 12 at one end thereof. The three hooks 13 are at the opposite end of the shank 11 and are hook-shaped in formation, usually including hook barbs such as 17.

About the shank 11 of the hook 10 I provide a bell-shaped protecting skirt 14 of the type illustrated. This skirt 14 closely encircles the shank 11 adjacent the hook eye 12 and is hollowed out at 15 to provide a relatively thin skirt 16 which flares outwardly. The flare of the skirt portion 16 extends to a diameter just slightly greater than the diameter of the circle including the ends of the hooks 13, and the points 17 of the hooks 13 terminate slightly spaced from the end of the skirt 16, as illustrated.

In operation, the hook or lure is connected to a fish line through the use of the hook eye 12 and the lure is drawn through the water. A fish biting the lure will readily flex the thin skirt 16, and as this skirt is extremely close to the ends 17 of the hooks 13, the fish is caught before he can eject the lure. The bell shape of the protecting skirt allows the lure to readily pass through weeds or other obstructions.

The lure B illustrated in Figures 4, 5, and 6 of the drawing, is virtually identical to the lure A, with the exception that the skirt is not circular at its lower end, as it contains scallops. The lure B includes a hook, indicated in general by the numeral 19, which is provided with a shank 20, a hook eye 21, and three hooks 22. A bell-shaped skirt or body of resilient material 23 closely encircles the shank 20 of the hook 19 at the end of the shank adjacent the eye 21 and is hollowed out at 24 to form a relatively thin resilient skirt 25. The skirt 25 extends to a diameter just slightly greater than the diameter of a circle through the points of the hooks, and the points 26 of the hook ends 22 are closely adjacent the ends of the skirt, as best illustrated in Figures 4 and 6.

The skirt portion 25 is cut to provide scallops 27 intermediate the portions of the skirt adjacent the hook ends 22 so as to decrease the size of the skirt portion.

In Figures 7 and 8 of the drawing I disclose my lure C as used with a single hook. In this construction a single hook 29 is used having an elongated shank 30, having at one end a hook eye 31 and having at its opposite end the hook end 32. Encircling the body of the shank 30 intermediate the ends, I provide a skirt-like body portion 33 which closely encircles the shank 30 at one end thereof closest to the eye end of the shank. The body 33 is hollowed at 34 to form a thin outwardly flared skirt 35 which will readily flex or compress. The point 36 of the hook end 32 extends in close relation to the end of the skirt 35 so that an extremely short time interval is provided between the time when the fish engages the lure and the time the fish is caught.

A pair of flexible wire arms 37 extend outwardly and rearwardly from the eye 31 of the hook so as to support spoon-shaped rotating elements 39 which may spin as the lure moves through the water. Swivels 40 on the arm 37 pivotally mount the spinner 39. Feathers or other decorative means, such as 41 may be secured to the small diameter end of the skirt-shaped body 33 so as to enhance the appearance of the lure.

It will be noted that the hook 29 may be positioned with its shank 30 at an angle to the longitudinal axis of the skirt body 33 if it is so desired. The body 33 is placed in an angular position in Figure 7 of the drawing for the purpose of illustration of this fact.

In Figures 9, 10, and 11 of the drawing, I disclose a lure D which is virtually identical with the lure A. The lure D includes a hook indicated in general by the numeral 42 having a shank 43 provided at one end, with a hook eye 44, and at the opposite end with hook ends 45. Encircling the shank 43, I provide a skirt portion 46 which closely encircles the shank 43 of the hook adjacent the eye 44 and which is hollowed at 47 to provide a thin outwardly flexing skirt 49. The points 50 of the hook ends 45 extend into extremely close proximity to the inner surface of the end of the skirt 49.

In order to render the skirt 49 more flexible between the hooks and in order to assist in rendering the skirt weedless and to additionally guard the points of the hooks, I provide wedge-shaped outwardly extending projections 51 on the outer surface of the skirt 46 adjacent the ends or points 50 of the hook 42. These wedge-shaped projections taper outwardly and thicken the skirt immediately adjacent the points of the hooks, so as to assist in guiding material about the hooks.

In Figures 12 and 13 of the drawing, I disclose another form of lure construction. In this lure E I provide a body, such as 52, made of wood, plastic, or other suitable material and having a hook 53 positioned with its shank 54 extending longitudinally through the body 52. The forward end of the hook 53 is provided with an eye 55, and a spinning element 56 is mounted on the shank 54 between a pair of bearing beads 57 and interposed between the eye 55 and the body 52. The hook end 59 is positioned with the point 60 of the hook facing forwardly.

A thin outwardly tapered skirt 61 of rubber or other suitable material is secured to the lower edge of the body 52 and extends downwardly so that its free end 62 is slightly spaced from the point 60 of the hook 53. In this way the hook 53 is protected as in the other constructions of my weedless lure.

In accordance with the patent statutes, I have described the principles of construction and operation of my lure, and while I have endeavored to set forth the best embodiments thereof, I desire to have it understood that obvious changes may be made within the scope of the following claims without departing from the spirit of my invention.

I claim:

1. A weedless lure comprising a hook, and a flexible resilient body encircling said hook, said body having one end secured to said hook and tapering outwardly from said hook in spaced relation thereto, the free edge of said body being tapered to a narrow edge spaced forwardly from the point of the hook and in close proximity thereto.

2. A weedless lure comprising a multiple hook element having points, and a flexible resilient body having one end secured to the shank of said element and otherwise unsupported thereby, said body extending outwardly at a gradual taper toward the points of the hook, the angle of taper increasing near the points of the hook, said flexible resilient body terminating in closely spaced relation to the points of the hook.

3. A weedless lure comprising a multiple hook, and a bell-shaped flexible resilient body encircling the shank of the hook, said body being secured at one end to said hook and otherwise unsupported thereby, and said body extending into proximity with the point of the hook and in spaced relation thereto.

4. A weedless hook comprising a multiple hook body having points, and a rubber bell-shaped hollow skirt encircling said hook body and secured at its closed end to the shank of said body and otherwise unsupported thereby, the skirt extending into spaced relation and in close proximity to the points of the body.

5. A weedless lure comprising a multiple hook having points, and a flexible resilient bell-shaped skirt encircling the shank of the hook and secured at one end thereto, the free edge of the skirt being tapered to a narrow edge extending into proximity with and in closely spaced relation to the points of the hook.

6. A weedless lure comprising a multiple hook having points, a flexible resilient skirt encircling the hook and secured thereto, said skirt extending into closely spaced relationship with the points of the hook, and cut away portions in said skirt intermediate the points of the hook.

7. A weedless lure comprising a hook having a point, a flexible resilient body secured to the shank of the hook and tapering outwardly therefrom to provide a substantially bell-shaped skirt, said skirt extending into proximity with the point of the hook, and a wedge-shaped outwardly extending projection on said skirt adjacent said hook point.

8. A lure comprising a multiple hook having points, a bell-shaped flexible resilient skirt encircling said hook and secured to the shank thereof, said skirt extending into close proximity with the points of the hook, and outwardly extending projections on said skirt adjacent the points of said hook.

ELWOOD A. RICHARDSON.